US007697772B2

(12) United States Patent
Isshiki (10) Patent No.: US 7,697,772 B2
(45) Date of Patent: Apr. 13, 2010

(54) APPARATUS, METHOD AND COMPUTER PROGRAM PRODUCT FOR PERFORMING IMAGE COMPRESSION OF IMAGE DATA

(75) Inventor: Naohiro Isshiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/949,318

(22) Filed: Dec. 3, 2007

(65) Prior Publication Data

US 2008/0080780 A1    Apr. 3, 2008

Related U.S. Application Data

(63) Continuation of application No. 10/737,779, filed on Dec. 18, 2003, now Pat. No. 7,305,137.

(30) Foreign Application Priority Data

Dec. 26, 2002   (JP)   ............................ 2002-378680

(51) Int. Cl.
  *G06K 9/36* (2006.01)
  *G06K 9/46* (2006.01)
(52) U.S. Cl. ..................................... 382/245; 382/243
(58) Field of Classification Search ................ 382/172, 382/173, 232, 233, 239, 243, 245, 162, 164, 382/166, 176, 181; 358/1.15, 1.16; 375/240, 375/240.23; 345/467; 341/50, 59, 60, 63, 341/65, 67, 107, 103
See application file for complete search history.

(56) References Cited

U.S. PATENT DOCUMENTS

| 4,876,541 | A  |   | 10/1989 | Storer ........................ 341/51 |
| 5,959,672 | A  | * | 9/1999 | Sasaki .................... 375/240.23 |
| 5,995,118 | A  |   | 11/1999 | Masuda ....................... 345/467 |
| 6,055,273 | A  |   | 4/2000 | Isomura ....................... 375/240 |
| 6,141,454 | A  | * | 10/2000 | Seymour et al. ............. 382/243 |
| 6,404,919 | B1 | * | 6/2002 | Nishigaki et al. ............ 382/176 |
| 6,466,694 | B2 | * | 10/2002 | Kamada et al. .............. 382/181 |
| 6,522,268 | B2 |   | 2/2003 | Belu ............................ 341/51 |
| 6,542,640 | B1 | * | 4/2003 | Morihara et al. ............. 382/229 |
| 6,792,153 | B1 |   | 9/2004 | Tsujii .......................... 382/239 |
| 6,804,401 | B2 | * | 10/2004 | Nelson et al. ................ 382/239 |
| 2004/0125404 | A1 | * | 7/2004 | Isshiki ........................ 358/1.15 |
| 2008/0080780 | A1 | * | 4/2008 | Isshiki ........................ 382/245 |

FOREIGN PATENT DOCUMENTS

| JP | 07-231391 | 8/1995 |
| JP | 09-205647 | 8/1997 |
| JP | 2001/219601 | 8/2001 |
| JP | 2002/077626 | 3/2002 |

* cited by examiner

*Primary Examiner*—Amir Alavi
(74) *Attorney, Agent, or Firm*—Fitzpatrick, Cella, Harper & Scinto (57) ABSTRACT

When image data to which attribute bits indicating attribute information of each pixel of an image has been attached is compressed, replacement bits for replacing the attribute bits are determined in accordance with the attribute bits. If total size of the attribute bits and image data exceeds a predetermined value, the attribute bits are replaced with the replacement bits and the replacement bits and image data are compressed. A bit string having a compression rate higher than that of the attribute bits before the replacement thereof is used as the replacement bits.

18 Claims, 6 Drawing Sheets

COLOR BIT
0 : COLOR
1 : MONOCHROME

FINE-LINE BIT
0 : NORMAL
1 : FINE

OBJECT TYPE BIT
00 : NONE
01 : CHARACTER
10 : GRAPHIC
11 : IMAGE

APPARATUS, METHOD AND COMPUTER PROGRAM PRODUCT FOR PERFORMING IMAGE COMPRESSION OF IMAGE DATA

CROSS REFERENCE TO RELATED APPLICATION

This application is a continuation of application Ser. No. 10/737,779, filed Dec. 18, 2003, now U.S Pat. No. 7,305,137 the entire contents of which are incorporated herein by reference.

FIELD OF THE INVENTION

This invention relates to an image processing technique through which image data, to which attribute bits indicative of pixel-by-pixel attributes have been attached, is compressed and held in a buffer of a prescribed size.

BACKGROUND OF THE INVENTION

The spread of information processing systems in recent years has been accompanied by greater demand for such systems to create many electronic documents in the form of color data and to output such data to color printers. Accordingly, it is desired that the image quality of color printers be improved.

A known method of improving the image quality of a color printer is to attach attribute bits to image data and execute the appropriate image processing. This method is such that at the stage where a raster image is generated in a host computer or printer, the type of drawing object (character, figure, image, color, monochrome, etc.) that constitutes the raster image is recognized, attribute bits indicative of the type of object are attached to each pixel constituting the object, and the raster data and attribute bits are adopted as the output data. When the output data is printed, the raster data is subjected to the appropriate image processing while reference is had to the attribute bits, whereby a printout having a high image quality can be obtained.

In the above-described method of adopting raster data and attribute bits as output data, the raster data and attribute bits are usually compressed and held in an output buffer. Since irreversible compression can be applied to the raster data at this time, size of the raster data after compression can be controlled by the compression rate. With regard to the attribute bits, on the other hand, the original data is necessary at the stage where image processing is executed and therefore only reversible compression is applied and size after compression is fixed. Consequently, there are occasions where, depending upon the type of data, size after compression is extremely large.

Accordingly, in a case where output buffer size is limited to a fixed value in order to limit system memory, the proportion of the buffer occupied by attribute bits increases if size after compression of the attribute bits is large. This means that the compression rate of the raster data must be raised to reduce the size of the raster data. If this is done, the decline in image quality ascribable to the increase in compression rate of the raster data will surpass the quality-improving effect achieved by use of the attribute bits. The result is a decline in the image quality of the output image.

SUMMARY OF THE INVENTION

Accordingly, an object of the present invention is to provide an image compression method for applying compression to image data, which comprises raster data and attribute bits, so as to minimize the compression rate of raster data and leave the maximum amount of attribute-bit information.

Another object of the present invention is to provide an image compression apparatus for applying compression to image data, which comprises raster data and attribute bits, so as to minimize the compression rate of raster data and leave the maximum amount of attribute-bit information.

According to the present invention, the foregoing objects are attained by providing an image compression method for compressing image data to which attribute bits indicating attribute information of each pixel has been attached, comprising, a predefined-bit determination step of determining replacement bits, which are to replace the attribute bits, in accordance with the attribute bits, a replacement step of replacing the attribute bits with the replacement bits if total size of the attribute bits and image data exceeds a predetermined value, and a compression step of compressing the replacement bits and the image data, wherein the replacement bits are a bit string having a compression rate higher than that of the attribute bits before the replacement thereof.

By virtue of this arrangement, image data comprising raster data and attribute bits can be subjected to compression that minimizes the compression rate of raster data and leaves the maximum amount of attribute-bit information.

The same replacement bits may be determined with regard to all pixels of the image at said predefined-bit determination step.

The replacement bits may be determined on a per-scanning-line basis at said predefined-bit determination step.

The attribute bits may be counted on a per-drawing-object basis and replacement bits corresponding to a drawing object having the highest count value may be determined at the predefined-bit determination step.

The replacement bits may be data obtained by replacing all attribute bits with the same replacement bits and then compressing the result in advance.

According to the present invention, the foregoing objects are attained by providing an image compression apparatus for compressing image data to which attribute bits indicating attribute information of each pixel has been attached, comprising, predefined-bit determination means for determining replacement bits, which are to replace the attribute bits, in accordance with the attribute bits, replacement means for replacing the attribute bits with the replacement bits if total size of the attribute bits and image data exceeds a predetermined value, and compression means for compressing the replacement bits and the image data, wherein the replacement bits are a bit string having a compression rate higher than that of the attribute bits before the replacement thereof.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

First, the structure of a laser printer and ink-jet printer, which are output units to which the image compression method of this embodiment is applied, will be described with reference FIG. 1. It should be noted that the printer to which this embodiment is applied is not limited to a laser printer or ink-jet printer, and it goes without saying the printer may employ another type of printing system.

Figure 1:
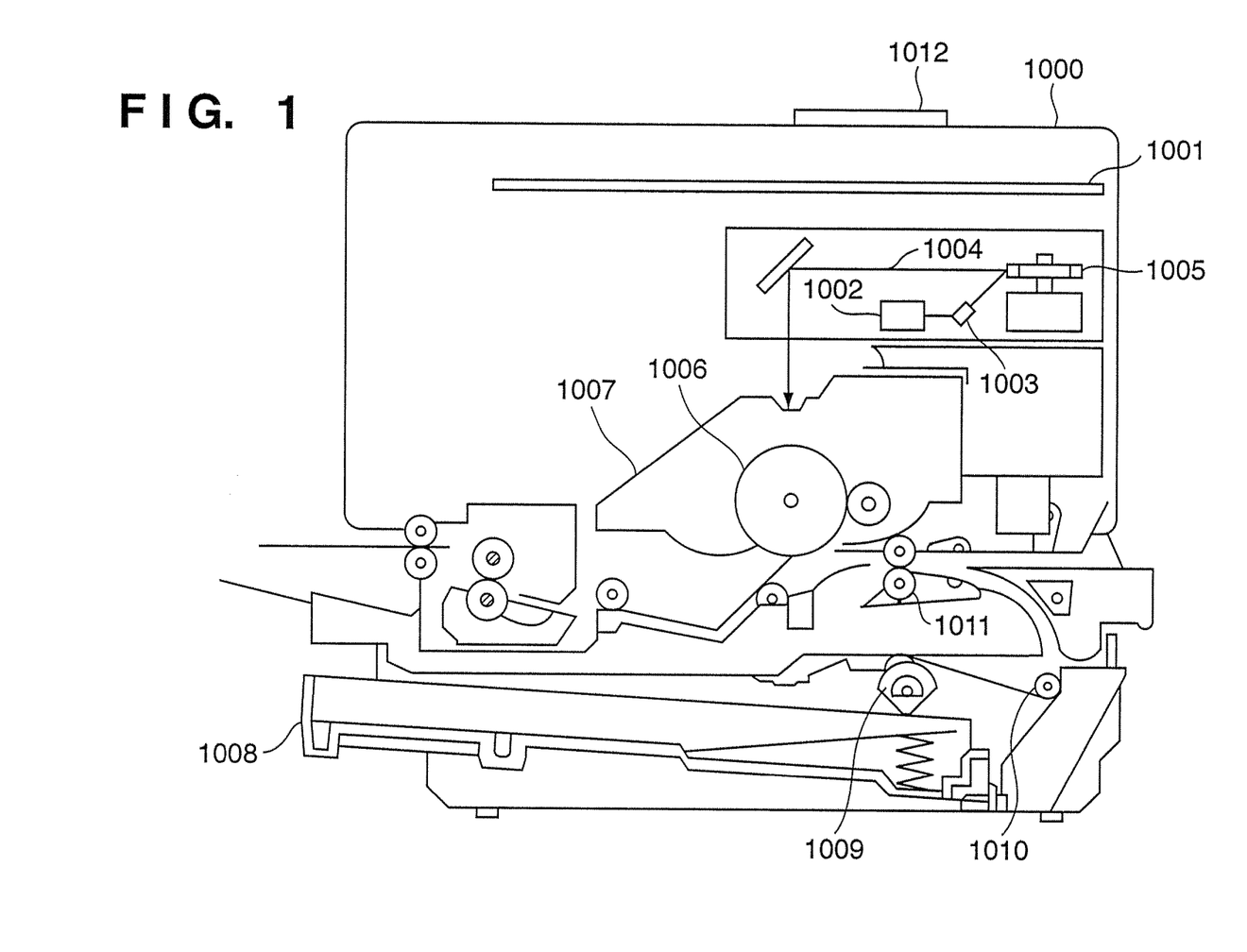
FIG. 1 is a sectional view illustrating the structure of a printer to which a first embodiment of the present invention is applied.

As shown in FIG. 1, a laser printer has a body 1000 for inputting and storing print information (character codes, etc.), form information or macro instructions, etc., supplied from an external information source such as a host computer connected externally by a network or directly by an interface, creating corresponding character patterns or form patterns, etc., in accordance with this information, and forming an image on printing paper or the like serving as a printing medium. The apparatus includes a control panel 1012 on which switches and LED indicators are arrayed for operation, and a printer control unit 1001 for controlling the overall laser printer 1000 and analyzing character information, etc., supplied from an external network. The printer control unit 1001 mainly converts character information to a video signal of the corresponding character pattern and outputs the video signal to a laser driver 1002. The latter is a circuit for driving a semiconductor laser 1003. A laser beam 1004 emitted from the semiconductor laser 1003 is switched on and off in accordance with the entered video signal. The laser beam 1004 is deflected back and forth by a rotating polygonal mirror 1005 so as to scan and expose an electrostatic drum 1006. As a result, an electrostatic latent image of a character pattern is formed on the electrostatic drum 1006. The latent image is developed by a developing unit 1007 surrounding the electrostatic drum 1006, after which the image is transferred to the printing paper. Cut sheets, which are used as the printing paper, are accommodated in a paper cassette 1008 loaded in the laser printer 1000. The sheets are fed into the apparatus and supplied to the electrostatic drum 1006 by a feed roller 1009 and transport rollers 1010, 1011.

Figure 2:
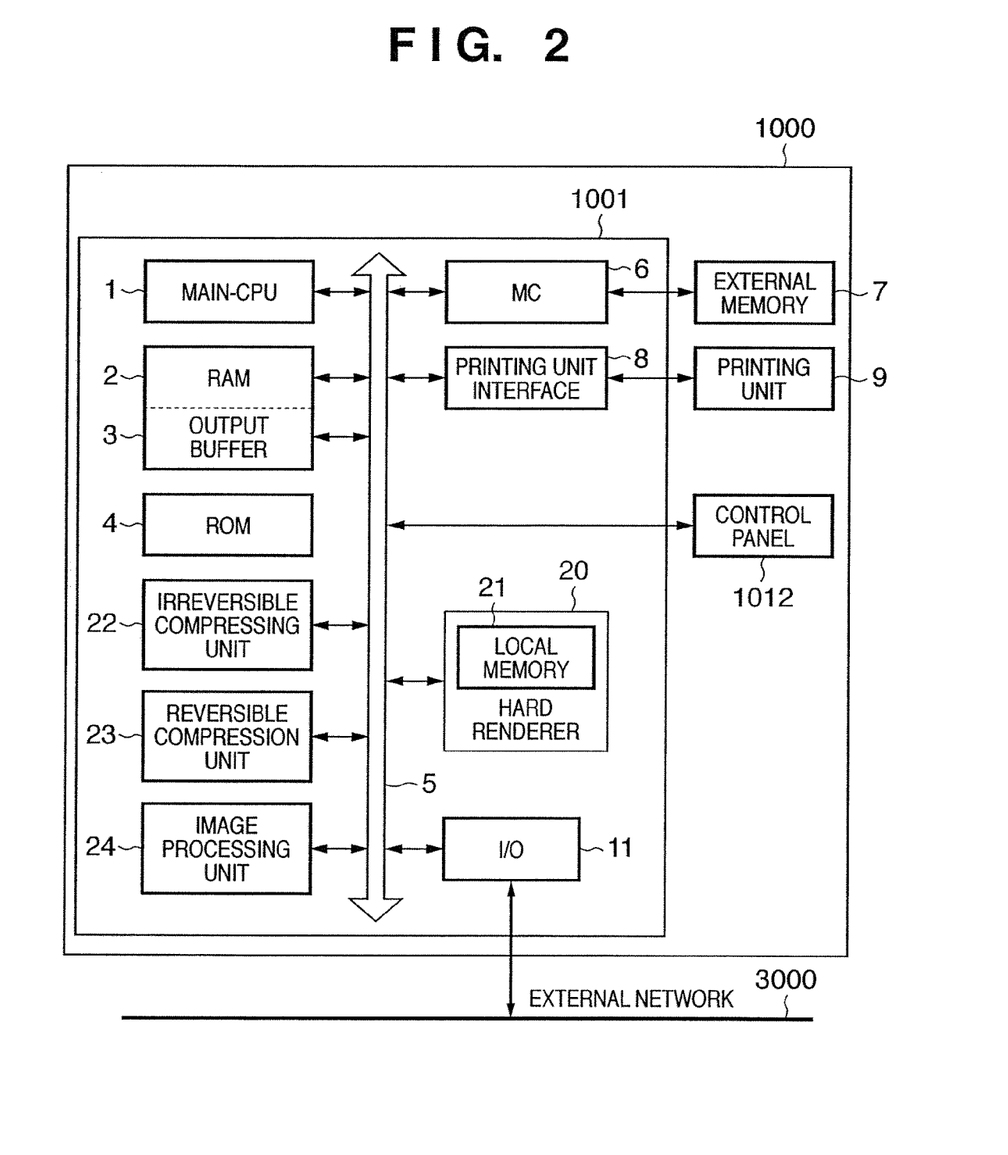
FIG. 2 is a block diagram illustrating the structure of a printer control system according to this embodiment.

FIG. 2 is a block diagram illustrating the configuration of a printer control system according to this embodiment. The printer control unit 1001 of FIG. 2 includes a CPU represented by MAIN-CPU 1. On the basis of a control program that has been stored in a ROM 4 or a control program that has been stored in an external memory 7, the MAIN-CPU 1 controls overall access to various devices connected to a system bus 5 and outputs an image signal as output information to a printing unit (printer engine) 9 connected to a printing unit interface 8. The control program of the MAIN-CPU 1 indicated by the flowcharts of FIGS. 4 and 5 and data necessary for controlling the printer 1000, such as predefined attribute-bit data for substitution, are stored in the ROM 4.

The MAIN-CPU 1 is adapted so as to be capable of communicating, via an input/output (I/O) unit 11, with an external device such as a host computer connected to an external network 3000. Though the MAIN-CPU 1 communicates with the host computer via the external network, it goes without saying that the MAIN-CPU 1 may be connected to the host computer directly via an interface (not shown) to achieve communication. A RAM 2 functions as the main memory and work area of the MAIN-CPU 1. The storage capacity of the RAM 2 can be expanded by optional RAM connected to an expansion port, not shown. An image output buffer 3 is provided in the RAM 2 and stores a raster image, which is created by a hard renderer 20 (described later), and attribute bits.

A memory controller (MC) 6 controls access to the external memory 7, such as a hard disk. The hard renderer 20 interprets a display list (DL), which has been transferred to a local memory 21, or a display list in RAM 2, and creates a raster image and attribute bits corresponding to each pixel of the raster image.

Figure 3:
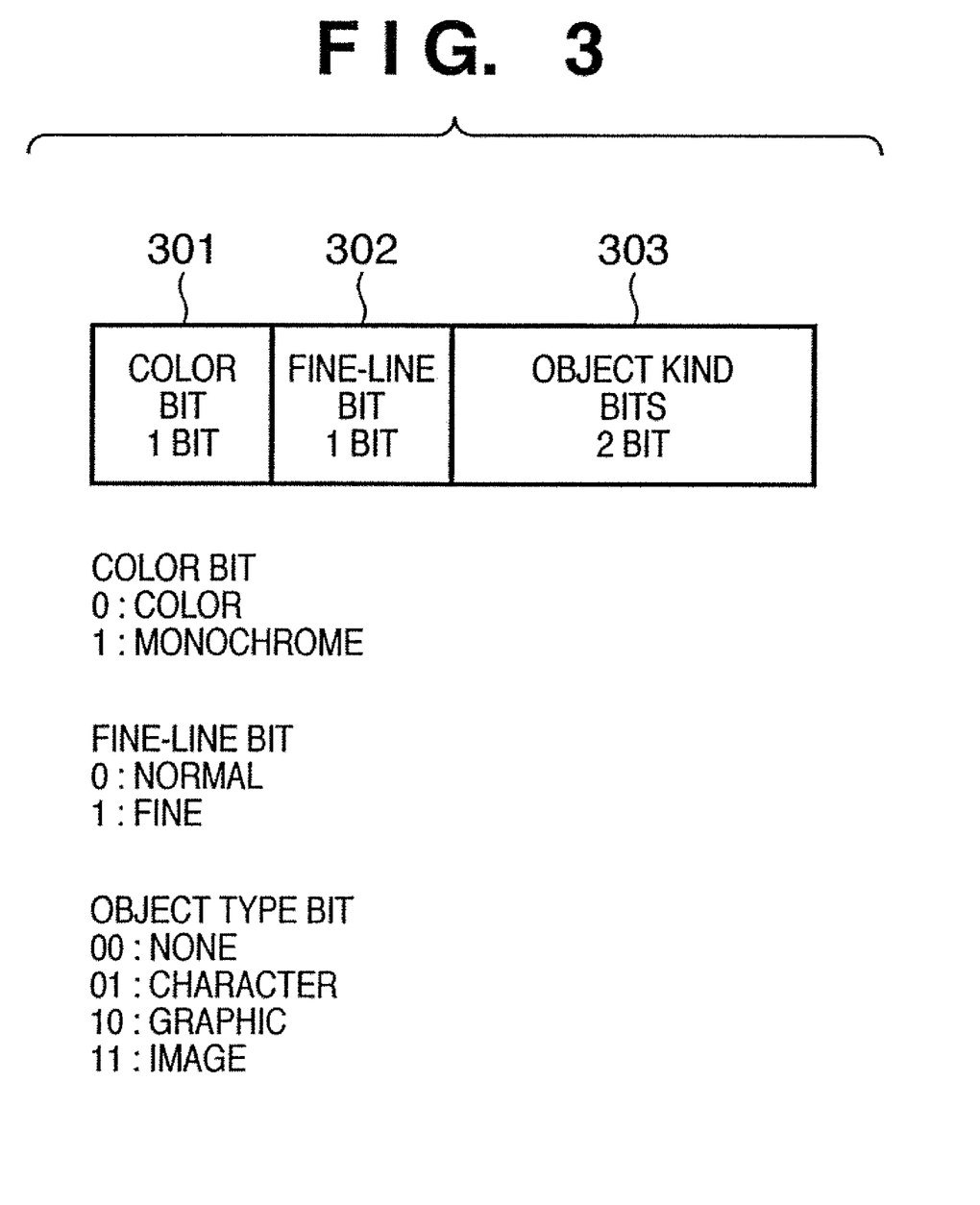
FIG. 3 is a diagram illustrating an example of attribute bits according to this embodiment.

FIG. 3 illustrates an example of each of the attribute bits generated by the hard renderer 20. The attribute bits shown in FIG. 3 are four in all, namely a 1-bit color bit 301, a 1-bit fine-line bit 302 and two object type bits 303. The color bit 301 indicates whether the corresponding pixel constitutes a color object or a monochrome object. The bit indicates a pixel constituting a color object when the bit is "0" and a pixel constituting a monochrome object when the bit is "1". The fine-line bit 302 indicates whether the corresponding pixel is one constructing a fine line. The bit is indicative of such a pixel when the bit is "1". The object type bits 303 indicate the particular type of drawing object the corresponding pixel constructs. Specifically, "01" indicates a pixel constructing a character object, "10" a pixel constructing a graphic object and "11" a pixel constructing an image object. Logic "00" indicates that the pixel does not construct any object whatsoever.

With reference again to FIG. 2, an irreversible compressing unit 22 applies irreversible compression to the raster image and stores the compressed data in the output buffer 3. A reversible compression unit 23 applies reversible compression to the attribute bits and stores the compressed data in the output buffer 3. On the basis of the attribute bits generated by the hard renderer 20, an image processing unit 24 subjects the raster data to image processing for characters, image processing for images, image processing for graphics, image processing for color, image processing for monochrome or image processing for fine lines or any combination of such processing. The operation of the printer control system of this embodiment constructed as set forth above will now be described in detail in accordance with the flowcharts of FIGS. 4 and 5.

Figure 4:
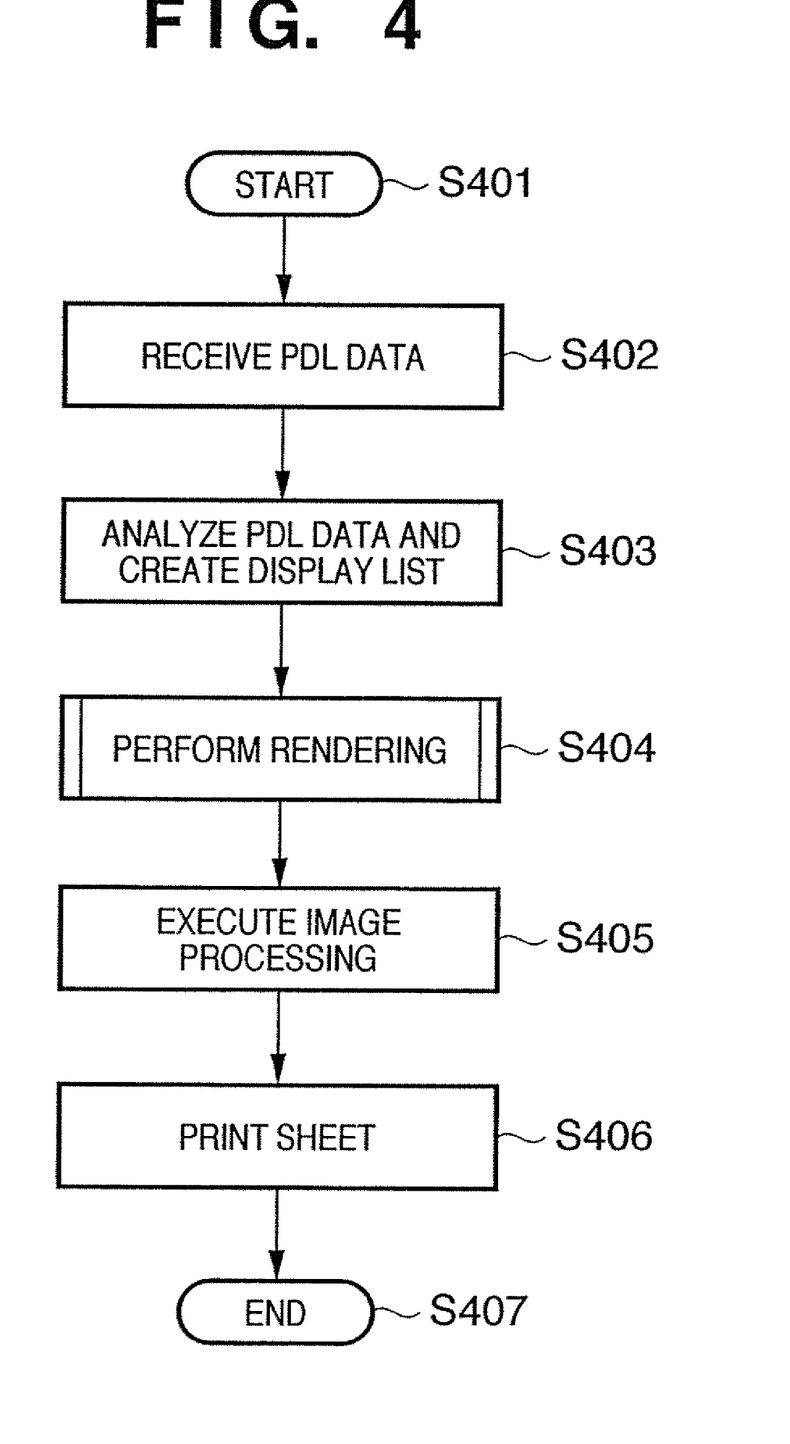
FIG. 4 is a flowchart illustrating the basic operation of a printer according to this embodiment.

FIG. 4 is a flowchart illustrating the basic operation of the printer 1000.

First, at step S402, the printer 1000 receives PDL data from the external network 3000, whereupon the MAIN-CPU 1 analyzes the PDL data and generates the display list (DL) at step S403. Then, at step S404, the created display list is analyzed and rendered by the hard renderer 20, thereby generating a raster image and attribute bits. The raster image thus generated is irreversibly compressed by the irreversible compressing unit 22 and the attribute bits are reversibly compressed by the reversible compression unit 23, after which the compressed results are stored in the output buffer 3. This is followed by step S405, at which the raster data is subjected to appropriate image processing that is in accordance with the attribute bits stored in the output buffer 3. Next, at step S406, the raster data that has undergone image processing is transferred to and printed by the printing unit 9. This processing is then exited.

Figure 5:
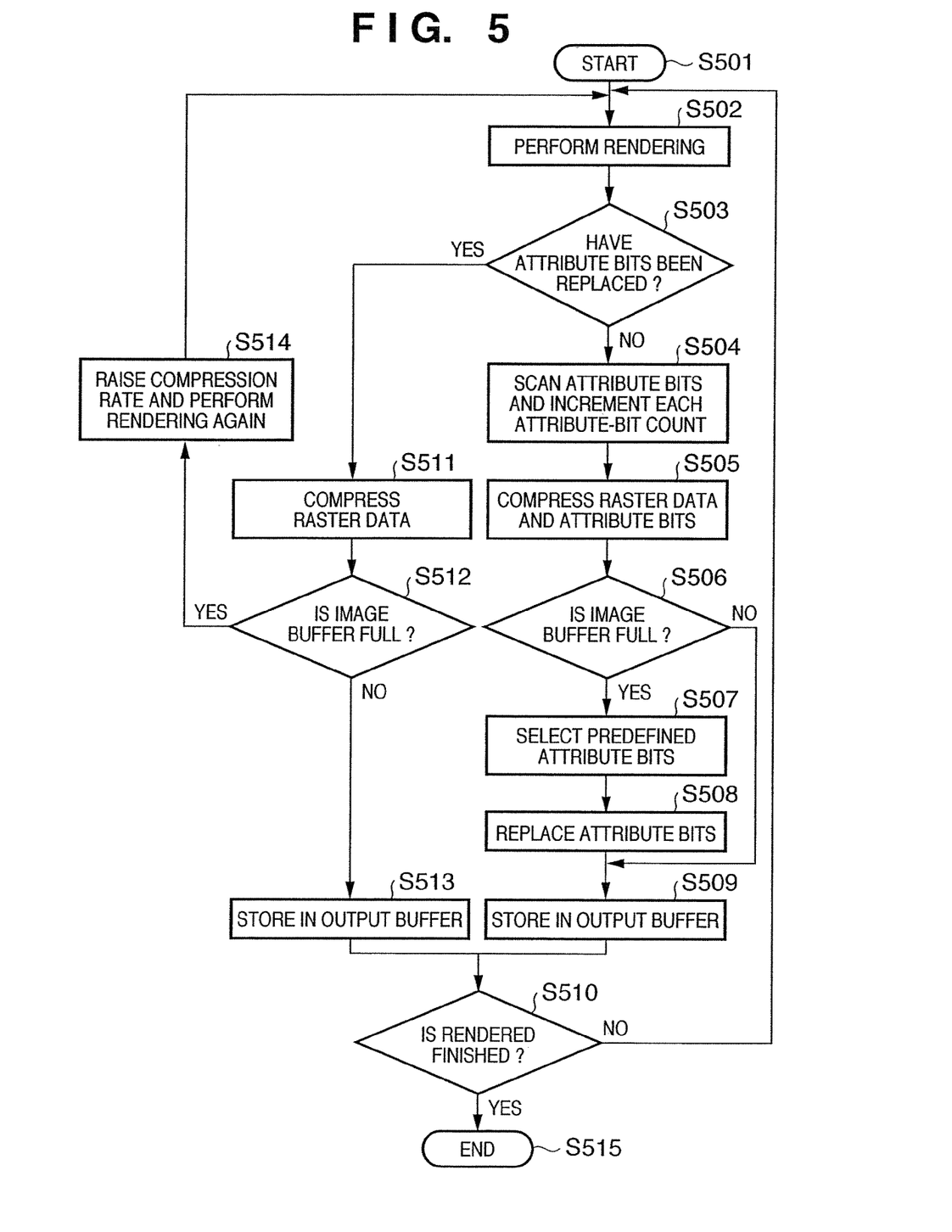
FIG. 5 is a flowchart illustrating rendering processing according to this embodiment.

Reference will now be had to the flowchart of FIG. 5 to describe, in detail, operation up to the storing of the raster image and attribute bits, which have been generated by the hard renderer 20 at step S404, in the output buffer 3.

When rendering by the hard renderer 20 starts at step S501 in FIG. 5, a raster image, which has been rendered 32 scanning lines at a time, and attribute bits corresponding to each pixel of the raster image are held in a temporary buffer provided in the RAM 2. Though it is described here that rendering is performed every 32 scanning lines, it goes without saying that this is merely one example and rendering may be performed at another number of scanning lines at a time.

Next, at step S503, an attribute-bit replacement flag is examined. If the attribute-bit replacement flag has not been set, i.e., if the flag indicates that attribute-bit replacement has not been performed even once, then control proceeds to step S504.

The object type bits 303 among the attribute bits held in the temporary buffer of RAM 2 are scanned at step S504. Counters for each type of drawing object, namely a counter for character objects, a counter for graphic objects and a counter for image objects, are each provided in the RAM 2. While scanning is being carried out, the counter corresponding to the object type bits 303 is incremented, thereby counting the number of pixels that belong to each drawing object. Then, at step S505, the raster image in the temporary buffer is transferred to the irreversible compressing unit 22, where irreversible compression is applied thereto, and the attribute bits in the temporary buffer are transferred to the reversible compression unit 23, where reversible compression is applied thereto.

During compression by the irreversible compressing unit 22 and reversible compression unit 23, it is regularly determined at step S506 whether output to the output buffer 3 is possible, i.e., whether the output buffer 3 is full. If it is possible for both compression units to provide outputs to the output buffer, the irreversibly compressed raster data and the reversibly compressed attribute bits are output to the output buffer 3 at step S509.

If it is found at step S506 that the output buffer 3 is full, control proceeds to step S507. Here, based upon the counters for each of the drawing objects counting at step S504, predefined attribute bits (referred to below simply as "predefined bits") used in replacing the present attribute bits are selected. In this embodiment, the following have been compressed and stored in the ROM 4 beforehand as the predefined bits: bits for character images in which all attribute bits have been filled by "0001", for graphic images in which all attribute bits have been filled by "0010", and for image-type images in which all attribute bits have been filled by "0011". Thus, since the predefined bits are such that the same bit strings are filled in with regard to the entirety of the image, the predefined bits have a high compression efficiency. The counters for each of the drawing objects are compared at step S507 and predefined bits corresponding to the highest count value, i.e., the drawing object occupying the largest area in the image rendered thus far, are selected. In other words, compressed data is selected in regard to predefined bits for a character if the count value for character objects is highest, for a graphic if the count value for graphic objects is highest, and for an image if the count value for image objects is highest.

At step S508, all attribute bits that have been stored in the output buffer 3 thus far are replaced with the predefined bits selected at step S507. That is, all of the attribute bits that have been stored in the output buffer 3 are deleted and predefined bits the number of which is the same as the number of scanning lines rendered thus far are stored in the output buffer 3. Furthermore, reversibly compressed attribute bits to be stored in the output buffer 3 at step S509, namely attribute bits that are currently stored in the temporary buffer and have been compressed by the reversible compression unit 23, are replaced with predefined bits. After all of the attribute bits that have been stored in the output buffer 3 are thus replaced with predefined bits, the attribute-bit replacement flag is set and control proceeds to step S509. Here the compressed raster 5 data and attribute bits are stored in the output buffer 3.

Next, at step S510, it is determined whether the rendering of all scanning lines has been completed. If rendering has been completed, the series of processing operations from rendering to storage of data is terminated. If rendering has not been completed, then control returns to step S502 and processing of the next 32 scanning lines is executed.

If it is found at step S503 that the attribute-bit replacement flag has set, i.e., that attribute-bit replacement has already been carried out, control proceeds to step S511. Here only the raster image in the temporary buffer is transferred to the irreversible compressing unit 22, where the image is subjected to irreversible compression. It is regularly determined at step S512 whether the irreversible compressing unit 22 is capable of providing an output to the output buffer 3 during compression, i.e., whether the output buffer 3 is full. If it is possible to provide an output to the output buffer 3, then, at step S513, the 32 scanning lines of the irreversibly compressed raster data and predefined bits, which have already been selected at step S507, are stored in the output buffer 3.

If it is determined at step S512 that the output buffer 3 is full, then it is judged that storage of data in the output buffer 3 is not possible at the compression rate of the irreversible compressing unit 22 for the present raster image. Control therefore proceeds to step S514, at which the irreversible compressing unit 22 is set in such a manner that a higher compression rate will be obtained. Rendering is then carried out again. That is, rendering is performed again from the first line.

In accordance with this embodiment, as described above, a high compression rate is obtained by replacing attribute bits, which have been created based upon data sent to the printer 1000, with predefined bits, already stored in the apparatus, in which the entirety of the image has been filled with the same bit strings. As a result, a greater area of the output buffer can be used for the irreversibly compressed raster image. In other words, even if the total size of the raster image and attribute bits exceeds the prescribed output-buffer size, storage in the output buffer is possible without making the compression rate of the raster image greater than necessary. This means that a high-quality output image can be obtained.

In addition, since the selected predefined bits to be substituted are those best suited to the data currently being processed, the appropriate image processing can be applied by the image processor and a high-quality image can be obtained.

Second Embodiment

A second embodiment according to the present invention will now be described.

In the first embodiment, an example in which each attribute bit is compressed in advance and stored in the ROM 4 is illustrated. However, results similar to those of the first embodiment can be obtained even if it is arranged to generate the compressed data at the time of replacement.

Specifically, in the second embodiment, only the type of attribute bit used is selected at step S507 in FIG. 5 of the first embodiment in accordance with the counter of each drawing object counting at step S504. More specifically, "0001" is selected if the count value for character objects is highest, "0010" if the count value for graphic objects is highest and "0011" if the count value for image objects is highest.

Then, at step S508, the attribute bits selected at step S507 are generated in a number equal to the number of scanning lines rendered thus far and the attribute bits are reversibly compressed, thereby generating predefined bits necessary to replace the attribute bits that have been stored in the output buffer 3, and substituting the predefined bits for these attribute bits. At step S508, the attribute bits in the temporary buffer are replaced with the predefined bits that have been obtained by generating and reversibly compressing the 32 scanning lines of attribute bits selected at step S507.

Further, at step S511, all uncompressed attribute bits in the temporary buffer are replaced with the predefined bits that have been selected at step S507, whereupon the raster image in the temporary buffer is transferred to the irreversible compressing unit 22, where irreversible compression is applied thereto, and the attribute bits in the temporary buffer are transferred to the reversible compression unit 23, where reversible compression is applied thereto.

The raster data and attribute bits compressed at step S511 are stored in the output buffer 3 at step S513.

In accordance with the second embodiment, as described above, compressed data obtained by compressing predefined bits is not prepared in advance. Rather, the compressed data is generated at the time of replacement, thereby providing effects similar to those of the first embodiment while conserving memory.

Third Embodiment

A third embodiment according to the present invention will now be described.

In a third embodiment, the basic operation of the printer 1000 is similar to that of the first embodiment. In the rendering processing indicated at step S404, the attribute bits are replaced with predefined bits if necessary when the raster image and attribute bits that have been generated by the hard renderer 20 are stored in the output buffer 3. At this time the predefined bits of the first embodiment are the same with regard to the entirety of the image, but the third embodiment is characterized in that the predefined bits are capable of being changed over in units of 32 scanning lines at a time.

The rendering operation at step S404 in the third embodiment will now be described in detail with reference to the flowchart of FIG. 6.

Figure 6:
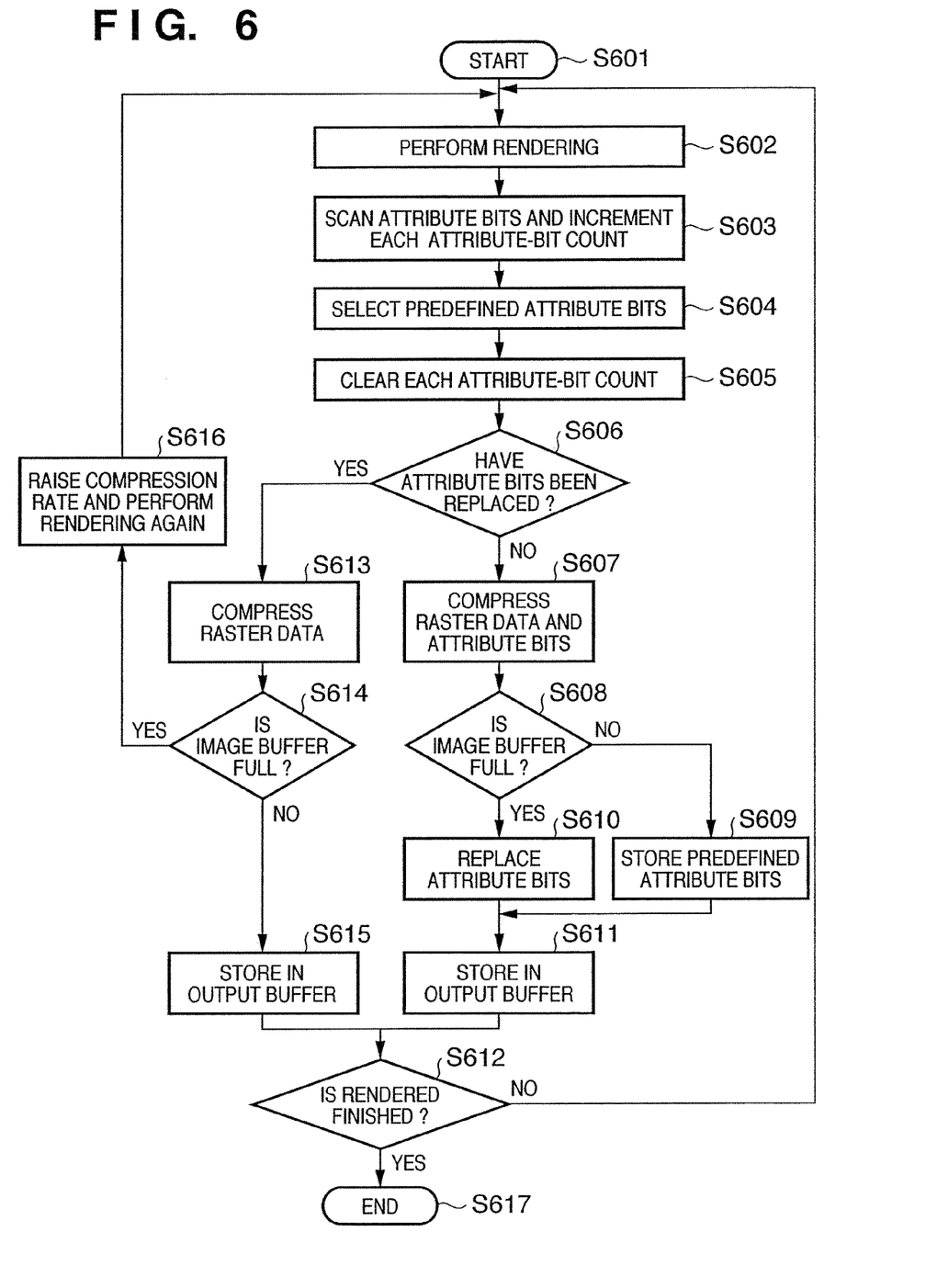
FIG. 6 is a flowchart illustrating rendering processing according to a third embodiment of the invention.

When rendering by the hard renderer 20 starts at step S601 in FIG. 6, a raster image, which has been rendered 32 scanning lines at a time, and attribute bits corresponding to each pixel of the raster image are held in a temporary buffer provided in the RAM 2. Though it is described here that rendering is performed every 32 scanning lines, it goes without saying that this is merely one example and rendering may be performed at another number of scanning lines at a time.

The object type bits 303 among the attribute bits held in the temporary buffer of RAM 2 are scanned at step S603. Counters for each type of drawing object, namely a counter for character objects, a counter for graphic objects and a counter for image objects, are each provided in the RAM 2. While scanning is being carried out, the counter corresponding to the object type bits 303 is incremented, thereby counting the number of pixels that belong to each drawing object.

This is followed by step S604. Here, based upon the counters for each of the drawing objects counting at step S603, predefined bits used in replacing the present attribute bits are selected. In this embodiment, the following have been compressed and stored in the ROM 4 beforehand as the predefined bits: bits for character images in which all attribute bits have been filled by "0001", for graphic images in which all attribute bits have been filled by "0010", and for image-type images in which all attribute bits have been filled by "0011". Since the predefined bits are such that the entire image is filled by the same bit strings, compression efficiency is high. The counters for each of the drawing objects are compared at step S604 and predefined bits corresponding to the highest count value, i.e., the drawing object occupying the largest area in the image contained in the temporary buffer, are selected. In other words, compressed data is selected in regard to predefined bits for a character if the count value for character objects is highest, for a graphic if the count value for graphic objects is highest, and for an image if the count value for image objects is highest.

The counter for each object is cleared at step S605, at which the attribute-bit replacement flag is examined at step S606. If the attribute-bit replacement flag has not been set, i.e., if the flag indicates that attribute-bit replacement has not been performed even once, then control proceeds to step S607. Here the raster image in the temporary buffer is transferred to the irreversible compressing unit 22, where irreversible compression is applied thereto, and the attribute bits in the temporary buffer are transferred to the reversible compression unit 23, where reversible compression is applied thereto.

During compression by the irreversible compressing unit 22 and reversible compression unit 23, it is regularly determined at step S608 whether output to the output buffer 3 is possible, i.e., whether the output buffer 3 is full. If it is possible for both compression units to provide outputs to the output buffer, control proceeds to step S609. Here 32 scanning lines of the predefined bits selected at step S604 are added to and stored in a predefined-bit buffer in RAM 2, after which control proceeds to step S611, where the compressed raster data and attribute bits are stored in the output buffer 3. With regard to pixels that have been rendered thus far, the predefined bits have been stored in units of 32 scanning lines in the predefined-bit buffer.

If it is found at step S608 that the output buffer 3 is full and output to the output buffer 3 is not possible, on the other hand, then control proceeds to step S610. Here all attribute bits in the output buffer 3 are replaced with the predefined bits stored in the predefined-bit buffer at step S605. Furthermore, after the result of compressing the attribute bits in the temporary buffer by the reversible compression unit 23 is replaced with the compressed data of the predefined bits selected at step S604, the predefined-bit buffer is cleared and the attribute-bit replacement flag is set. Control then proceeds to step S611.

After the compressed raster data and attribute bits have been stored in the output buffer 3 at step S611, control proceeds to step S612. Here it is determined whether the rendering of all scanning lines has been completed. If rendering has been completed, the series of processing operations from rendering to storage of data is terminated. If rendering has not been completed, then control returns to step S602 and processing of the next 32 scanning lines is executed.

If it is found at step S606 that the attribute-bit replacement flag has set, i.e., that attribute-bit replacement has already been carried out, control proceeds to step S613. Here only the raster image in the temporary buffer is transferred to the irreversible compressing unit 22, where the image is subjected to irreversible compression. It is regularly determined at step S614 whether the irreversible compressing unit 22 is capable of providing an output to the output buffer 3 during compression, i.e., whether the output buffer 3 is full. If it is possible to provide an output to the output buffer 3, then, at step S615, the 32 scanning lines of the irreversibly compressed raster data and predefined bits, which have already been selected at step S507, are stored in the output buffer 3.

If it is determined at step S614 that the output buffer 3 is full, then it is judged that storage of data in the output buffer 3 is not possible at the compression rate of the irreversible compressing unit 22 for the present raster image. Control therefore proceeds to step S616, at which the irreversible compressing unit 22 is set in such a manner that a higher compression rate will be obtained. Rendering is then carried out again. That is, rendering is performed again from the first line.

In accordance with the third embodiment, as described above, a high compression rate is obtained because, in contrast with the first embodiment, predefined bits that are for substitution are filled with the same bit string in units of a prescribed number of scanning lines (32 scanning lines). In addition, image processing based upon attribute bits can be executed more appropriately. This makes it possible to obtain an output image exhibiting a high image quality.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

If the present invention is realized as a storage medium, program codes corresponding to the above mentioned flowcharts (FIG. 4, FIG. 5 and/or FIG. 6) are to be stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. An image compression method performed by a processor for compressing image data and attribute data corresponding respectively to each pixel of the image data, the method comprising:
   a generating step, by the processor, of generating raster image data and attribute data corresponding to each pixel of the raster image data based on input data and executing a rendering process;
   a replacing step, by the processor, of replacing the attribute data with corresponding replacement data;
   a compressing step, by the processor, of compressing the replacement data and the raster image data; and
   a storing step, by the processor, of storing the compressed replacement data and the compressed raster image data into a memory,
   wherein a compression rate of the replacement data corresponding to the attribute data is higher than a compression rate of the attribute data.

2. The method according to claim 1, further comprising:
   another compressing step, by the processor, of compressing the raster image data and the attribute data; and
   a determining step, by the processor, of determining whether a total data size of the compressed raster image data and the attribute data exceeds a predetermined value,
   wherein the replacing step is performed if the total data size of the compressed raster image data and the attribute data exceeds the predetermined value.

3. The method according to claim 1, wherein the attribute data includes a plurality of bits, and wherein the replacing is made by replacing a bit of the plurality of bits with a predetermined value.

4. The method according to claim 1, wherein the replacing is made for the attribute data corresponding to the image data.

5. The method according to claim 1, wherein the replacing is executed on a unit of a scanned line.

6. The method according to claim 1, farther comprising determining the replacement data in accordance with the attribute data.

7. An apparatus for compressing image data and attribute data corresponding respectively to each pixel of the image data, the apparatus comprising:
- a generating unit operable to generate raster image data and attribute data corresponding to each pixel of the raster image data based on input data and executing a rendering process;
- a processor operable to replace the attribute data with corresponding replacement data;
- a compressing unit operable to compress the replacement data and the raster image data,
- wherein the processor is configured to store the compressed replacement data and the compressed raster image data into a memory, and
- wherein a compression rate of the replacement data corresponding to the attribute data is higher than a compression rate of the attribute data.

8. The apparatus according to claim 7,
- wherein the compressing unit compresses the raster image data and the attribute data,
- wherein the processor determines whether a total data size of the compressed raster image data and the attribute data exceeds a predetermined value, and
- wherein the processor replaces the attribute data with the replacement data if the total data size of the compressed raster image data and the attribute data exceeds the predetermined value.

9. The apparatus according to claim 7, wherein the attribute data includes a plurality of bits, and wherein the processor replaces the attribute data with the replacement data by replacing a bit of the plurality of bits with a predetermined value.

10. The apparatus according to claim 7, wherein the processor is further operable to replace the attribute data corresponding to the image data.

11. The apparatus according to claim 7, wherein the processor is further operable to replace the attribute data corresponding to a unit of a scanned line.

12. The apparatus according to claim 7, wherein the processor is further operable to determine the replacement data based on the attribute data.

13. A computer-readable medium having stored thereon sequences of instructions, the sequences of instructions including instructions which when executed by a computer system causes the computer system to perform:
- a generating step of generating raster image data and attribute data corresponding to each pixel of the raster image data based on input data and executing rendering process;
- a replacing step of replacing attribute data associated with image data with corresponding replacement data, the attribute data corresponding respectively to each pixel of the image data;
- a compressing step of compressing the replacement data and the raster image data; and
- a storing step of storing the compressed replacement data and the compressed raster image data into a memory,
- wherein a compression rate of the replacement data corresponding to the attribute data is higher than a compression rate of the attribute data.

14. The computer-readable medium of claim 13 further comprising:
- another compressing step of compressing the raster image data and the attribute data, and
- a determining step of determining whether a total data size of the compressed raster image data and the attribute data exceeds a predetermined value,
- wherein the replacing step is performed if a total data size of the compressed raster image data and the attribute data exceeds the predetermined value.

15. The computer-readable medium according to claim 13, wherein the attribute data includes a plurality of bits, and wherein the computer-readable medium of has stored thereon sequences of instructions, the sequences of instructions including instructions which when executed by a computer system causes the computer system to perform the replacing by replacing a bit of the plurality of bits with a predetermined value.

16. The computer-readable medium of claim 13 having stored thereon sequences of instructions, the sequences of instructions including instructions which when executed by a computer system causes the computer system to perform the replacing for the attribute data corresponding to the image data.

17. The computer-readable medium of claim 13 having stored thereon sequences of instructions, the sequences of instructions including instructions which when executed by a computer system causes the computer system to perform the replacing on a unit of a scanned line.

18. The computer-readable medium of claim 13 having stored thereon sequences of instructions, the sequences of instructions including instructions which when executed by a computer system causes the computer system to perform:
- determining the replacement data in accordance with the attribute data.

* * * * *